Figure 3:
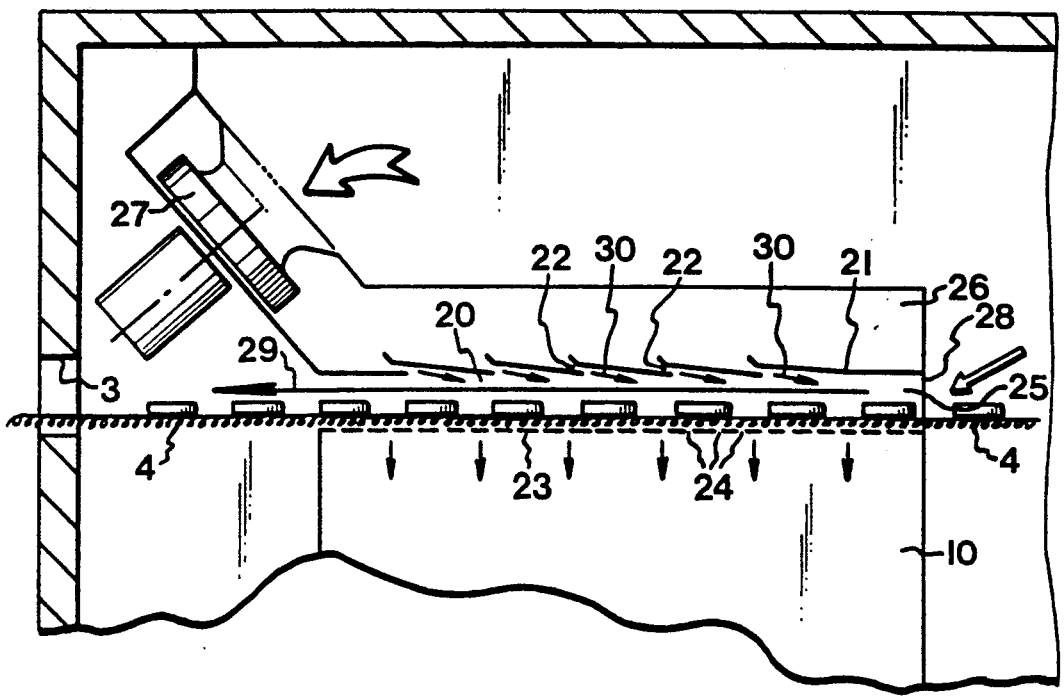

United States Patent [19]

Jaxmar et al.

[11] Patent Number: 5,247,801
[45] Date of Patent: Sep. 28, 1993

[54] AIR TREATMENT PLANT AND METHOD FOR A FLOW REDUCTION THEREIN

[75] Inventors: Leif Jaxmar, Vallakra; Allan Alfred, Helsingborg, both of Sweden

[73] Assignee: Frigoscandia Food Process Systems A.B., Helsingborg, Sweden

[21] Appl. No.: 854,599

[22] Filed: Jun. 9, 1992

[30] Foreign Application Priority Data

Nov. 29, 1989 [SE] Sweden .................... 8904056-2

[51] Int. Cl.[5] .................................. F25D 13/06
[52] U.S. Cl. .................................. 62/63; 62/57; 62/380; 34/207; 34/225
[58] Field of Search ............... 62/57, 63, 380; 34/207, 34/225

[56] References Cited

U.S. PATENT DOCUMENTS

| | | | |
|---|---|---|---|
| 3,238,736 | 3/1966 | MacIntosh | 62/63 |
| 3,267,585 | 8/1966 | Futer | 62/63 |
| 3,600,901 | 8/1971 | Wagner | 62/63 |
| 3,691,644 | 9/1972 | Schnitzer | 62/57 |
| 3,789,516 | 2/1974 | Schraft et al. | 34/225 |
| 3,855,815 | 12/1974 | Wagner | 62/266 |
| 4,100,760 | 7/1978 | Cheney | 62/63 |
| 4,177,647 | 12/1979 | Overbye | 34/225 |
| 4,813,245 | 3/1989 | Hubert et al. | 62/380 |

*Primary Examiner*—Ronald C. Capossela
*Attorney, Agent, or Firm*—Browdy and Neimark

[57] ABSTRACT

An air treatment plant for food is closed with the exception of an inlet and an outlet opening (3). In the plant, a pressure increase needed for circulating the treatment air tends to produce an air flow in one direction (29) through an inlet or outlet tunnel (20) communicating with the inlet or the outlet opening. The tunnel (20) has an upper wall (21) in which are arranged nozzles (22) directed substantially opposite to said direction (29), and a lower wall (23) formed with openings (24) for evacuating the excess air in the tunnel (20) produced by air jets (30) generated by a fan (27) and emanating from nozzles (22). A method for reducing the air flow in the inlet or outlet tunnel thus comprises the steps of directing a plurality of air jets (30) from the upper boundary surface (21) of the tunnel (20) substantially opposite to said direction (29), and evacuating from the tunnel the excess air produced by the air jets through openings (24) in the lower boundary surface (23) of the tunnel.

11 Claims, 3 Drawing Sheets

FIG._1
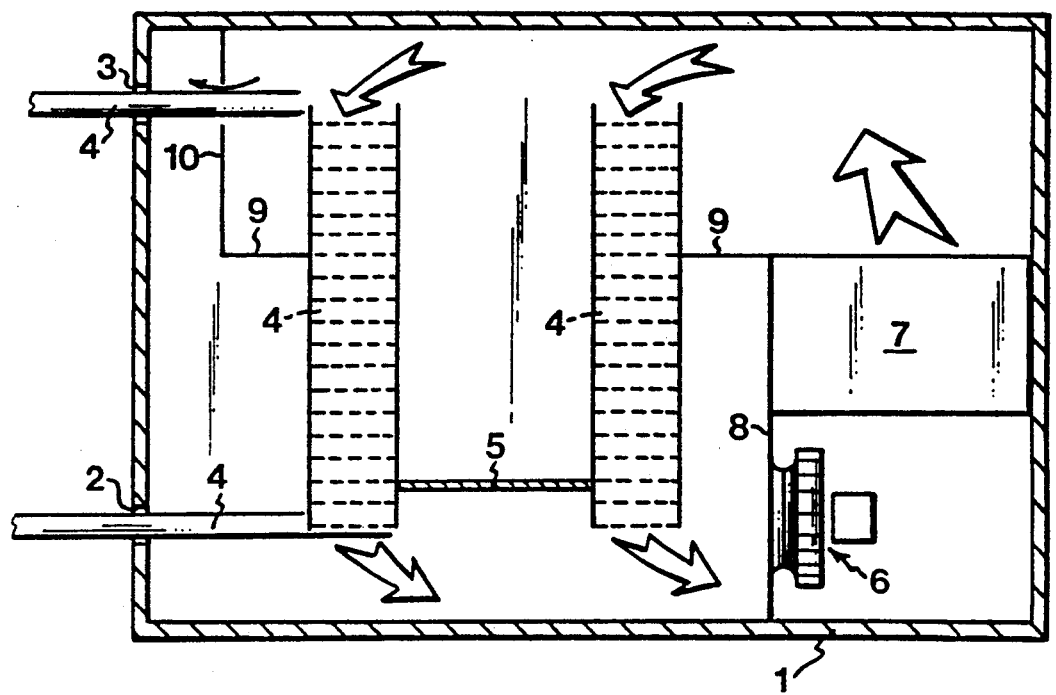
FIG._2
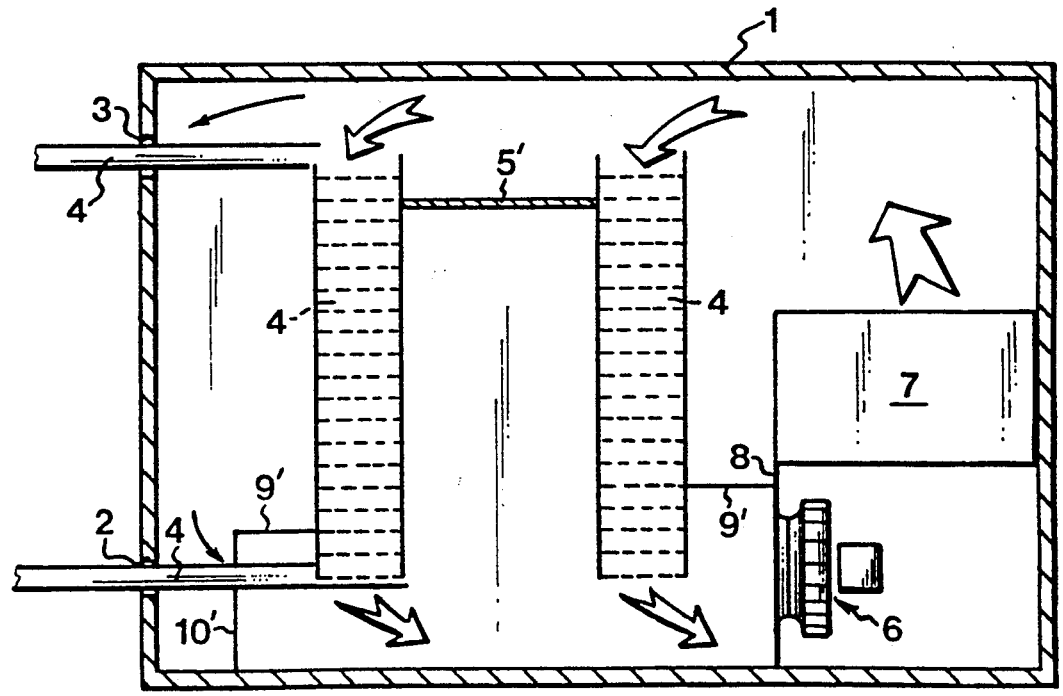

AIR TREATMENT PLANT AND METHOD FOR A FLOW REDUCTION THEREIN

The present invention generally relates to air treatment plants comprising a housing; a conveyor adapted to feed food to be processed through an inlet opening in said housing, to and through an air treatment area, and to feed the processed food from said area to and through an outlet opening in said housing; a heat exchanger; and a circulation fan for generating a circulating air flow through the heat exchanger, the air treatment area, and the circulation fan in succession.

More precisely, the invention concerns a method for eliminating, or at least reducing, the air flow through an inlet or outlet opening in an air treatment plant of this type. The invention is also directed at such a plant for carrying out the inventive method.

It is the fan in such air treatment plants that generates the requisite pressure increase for propelling the air flow through the heat exchanger and the air treatment area. Thus, there occurs within this area a pressure drop in the direction of the air flow.

Increasing the capacity of such an air treatment plant either requires an increased air flow, i.e. a higher air flow velocity, or an enlarged air treatment area. In both cases, the pressure drop within the air treatment area must be increased, thus augmenting the tendency to unwanted air flows through the inlet opening and/or the outlet opening of the housing.

One object of the invention is, therefore, to provide a method for reducing such air flows, especially in an air treatment plant of the type stated in the introduction to this specification, in which the conveyor travels through an inlet tunnel communicating with the inlet opening and/or an outlet tunnel communicating with the outlet opening. Another object of the invention is to provide an air treatment plant of the type stated in the introduction to this specification, by which the inventive method can be implemented.

According to the invention, a method for reducing the air flow in an inlet or outlet tunnel communicating with an inlet or outlet opening in an otherwise closed air treatment plant for food, in which plant a pressure increase needed for circulating the treatment air tends to produce an air flow in one direction through the tunnel, is characterised in that a plurality of air jets are directed from the upper boundary surface of the tunnel substantially opposite to said direction, and that the excess air produced by the air jets is evacuated from the tunnel through openings in the lower boundary surface thereof.

The air jets can be generated by a pressure which is substantially higher than the maximum pressure in the tunnel. Further, nozzles distributed across the upper boundary surface of the tunnel may serve to direct the air jets.

Suitably, the evacuation openings are dimensioned so as to let through substantially the same amount of air as is supplied by the air jets. In each section of the tunnel length, the area of the openings should further be substantially adapted to the excess air in that tunnel section length.

According to the invention, an air treatment plant for food, which is closed with the exception of an inlet and an outlet opening and in which a pressure increase needed for circulating the treatment air tends to produce an air flow in one direction through an inlet or outlet tunnel communicating with the inlet or the outlet opening, is characterised in that the tunnel has an upper wall in which are arranged nozzles directed substantially opposite to said direction, and a lower wall formed with openings for evacuating the excess air in the tunnel produced by air jets generated by a fan and emanating from the nozzles.

Preferably, the fan generates a pressure which is substantially higher than the maximum pressure in the tunnel.

Suitably, the evacuation openings are dimensioned so as to let through substantially the same amount of air as is supplied by the air jets. Most preferably, the area of the openings in each section of the tunnel length is substantially adapted to the excess air in that tunnel section length.

Figure 4:
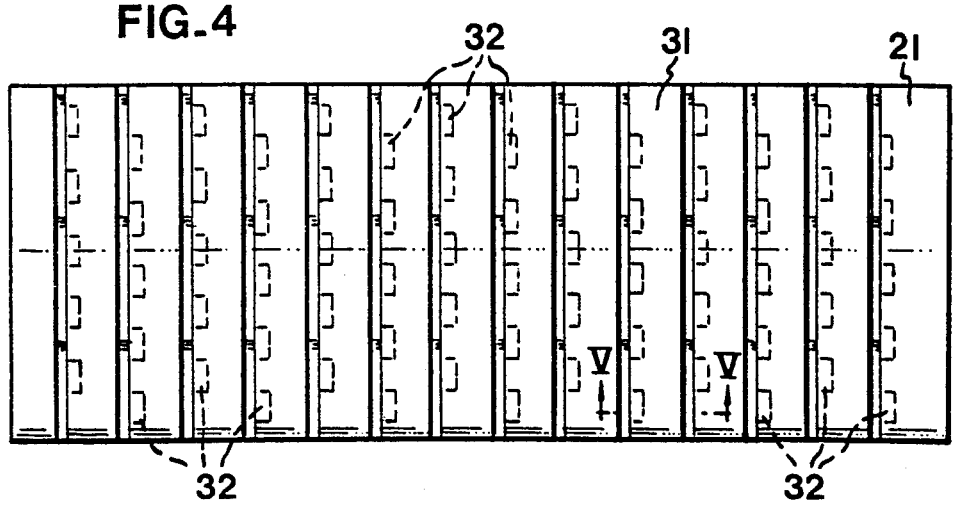
Figure 5:
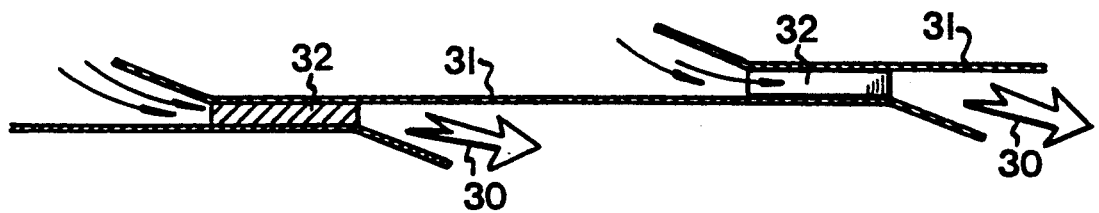
Figure 6:
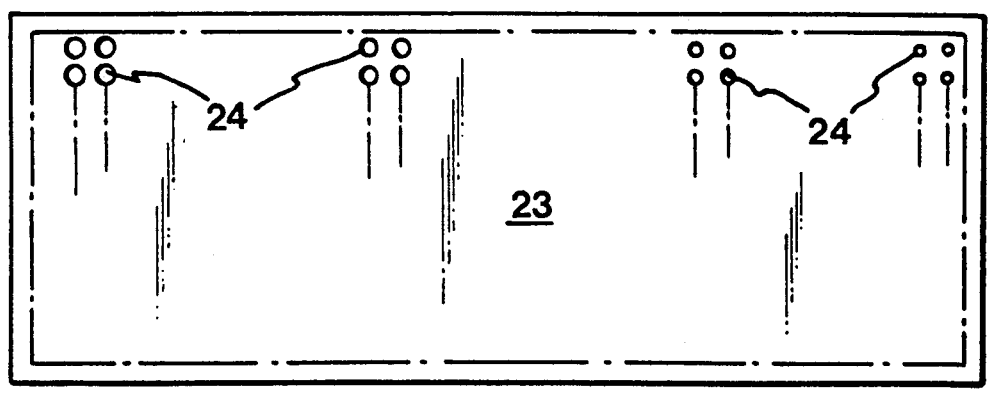

One embodiment of the invention will be described below, reference being had to the accompanying drawings, in which FIGS. 1 and 2 are schematic cross-sections of two prior art refrigerating plants to which the invention is applicable, FIG. 3 illustrates an embodiment of the invention applied to the refrigerating plant in FIG. 1, FIG. 4 is a plan view of an upper wall in FIG. 3, FIG. 5 is a longitudinal section taken along the line V—V in FIG. 4, and FIG. 6 is a plan view of a lower wall in FIG. 3.

The refrigerating plant shown in FIG. 1 comprises a housing 1 with an inlet opening 2 and an outlet opening 3. The interior of the housing 1 communicates with the surrounding atmosphere only via these openings 2 and 3. A conveyor consists of a conveyor belt 4 and a supporting structure (not shown). The conveyor belt 4 travels through the inlet opening 2 to the centre of the housing 1 where it takes a helical path up through said housing 1 which it leaves through the outlet opening 3. The conveyor belt 4 is endless, and its return path from the outlet opening 3 to the inlet opening 2 on the outside of the housing 1 is not shown. Owing to the helical path of the belt inside the housing 1, a drum-shaped belt pile is formed, which has a central through opening and which, at its bottom, is closed by means of a sheet metal plate 5. In addition, the housing 1 contains a circulation fan 6, a cooling-coil battery 7, and partitions 8, 9 and 10. In operation, the fan 6 generates a circulating air flow through the cooling-coil battery 7, the belt pile and itself, as indicated by arrows. The belt pile, through which the circulating air flows, defines an air treatment area for the food carried on the conveyor belt 4. The bottom plate 5 and the partitions 9 and 10 force the air to flow through the belt pile and essentially prevent it from escaping through the outlet opening 3.

In the refrigerating plant shown in FIG. 1, the pressure between the fan 6 and the cooling-coil battery 7 is substantially higher than the ambient pressure, the pressure between the cooling-coil battery 7 and the belt pile is higher than the ambient pressure, and the pressure in the remainder of the housing 1 just about equals the ambient pressure.

The embodiment shown in FIG. 2 of a prior art refrigerating plant corresponds to the embodiment in FIG. 1, with the exception of the provision of a cover plate 5' and the positions of the partitions 9' and 10'. Owing to these dissimilarities, the pressure between the fan 6 and the cooling-coil battery 7 is, in the embodiment of FIG. 2, higher than the ambient pressure, the pressure between the cooling-coil battery 7 and the belt pile is substantially equal to the ambient pressure, and the pressure between the belt pile and the fan 6 is lower than the ambient pressure.

In FIG. 3, which corresponds to the left upper part of the refrigerating plant in FIG. 1, an outlet tunnel 20 communicates with the outlet opening 3. The tunnel 20 has an upper boundary surface in the form of an upper wall 21 provided with a plurality of air supply nozzles 22, as well as a lower boundary surface in the form of a lower wall 23 formed with a plurality of openings 24. The tunnel 20 is further defined by side walls 25, one of which is shown in FIG. 3.

The lower wall 23 is directly connected to the partition 10. The upper wall 21 constitutes the bottom of a chamber 26 in which a fan 27 generates a comparatively high pressure by sucking in air from the area on the high-pressure side of the belt pile formed of the belt 4.

During operation of the refrigerating plant in FIGS. 1 and 3, the pressure at the inner end 28 of the tunnel 20 becomes higher than the ambient pressure, thus tending to generate an air flow through the tunnel 20 in a direction 29, towards and through the outlet opening 3. This is, of course, highly undesirable, and is prevented altogether, or at least almost, by the fan-generated pressure in the chamber 26, producing strong air jets 30 from the nozzles 22 substantially opposite to the direction 29. When properly dimensioned, these air jets 30 stop and prevent all air flow through the tunnel 20 from the end 28 to the outlet opening 3.

The air jets 30, which all have essentially the same high initial velocity, will spend their energy fairly quickly, thereby producing an excess of air in the tunnel 20, which is evacuated through the openings 24 in the lower wall 23 to the compartment below where there is essentially ambient pressure.

Thus, it is important that the openings 24 are so dimensioned that they let through substantially the same volume of air as is supplied by the air jets 30. To avoid as far as possible the emergence of air flows in the longitudinal direction of the tunnel 20, it is further desirable that, in each section of the tunnel length, the area of the openings 24 is substantially adapted to the excess air generated by the air jets 30 in that tunnel section length. Since the pressure in the tunnel 20 decreases from the end 28 towards the outlet opening 3, the area of the openings 24 should increase in the same direction, as shown in FIG. 6.

As is apparent from FIGS. 4 and 5, the upper wall 21 of the tunnel 20 can be made up of a plurality of substantially rectangular metal sheets 31 overlapping in the longitudinal direction of the tunnel 20. Between the metal sheets 31 are mounted spacers 32 having a thickness of, for instance, no more than a few millimeters, the nozzles 22 being defined by two metal sheets 31 and two spacers 32, or one spacer 32 and one side wall 25. The front and rear edges of each sheet 31 are outwardly bent from the plane of the sheet to direct the air jets 30 obliquely forwards and downwards, towards the end 28 of the tunnel.

To give the air jets 30 the requisite velocity, the pressure in the chamber 26 should be many times higher than the pressure at the end 28 of the tunnel 20, i.e. the maximum pressure in the tunnel 20.

It goes without saying that the invention is not restricted to the embodiment described above. Naturally, it may also be used in air treatment plants for refrigerating, heating or drying. Further, the inventive tunnel may be arranged at both the outlet and the inlet opening, or at only on of these openings. Moreover, the air flow stopped by the tunnel may be directed towards or from the opening at issue.

What is claimed is:

1. A method for reducing the air flow in a tunnel having an upper, a lower and two side boundary surfaces and communicating with an opening in an otherwise closed air treatment plant for food, in which plant treatment air is circulated by a pressure increase tending to produce an air flow in one direction through the tunnel, said method comprising the steps of
    directing a plurality of air jets from the upper boundary surface of the tunnel substantially opposite to said one direction, and
    evacuating excess air, produced by said air jets, from the tunnel through openings in the lower boundary surface thereof.

2. The method of claim 1, comprising the steps of generating a pressure outside the tunnel which is substantially higher than a maximum pressure in the tunnel and using said higher pressure for generating the air jets.

3. The method of claim 1, wherein nozzles distributed across the upper boundary surface of the tunnel are used for directing the air jets.

4. The method of claim 1, comprising passing through the evacuation openings substantially the same amount of air as supplied by the air jets.

5. The method of claim 4, wherein, in each section of the tunnel length, the area of the openings is substantially adapted to the excess air generated by the air jets in that tunnel section length.

6. The method of claim 1, wherein substantially the same initial velocity is imparted to all the air jets.

7. An air treatment plant for food having an inlet opening and an outlet opening and being closed with the exception of said inlet and outlet openings, said air treatment plant comprising an inlet tunnel and an outlet tunnel communicating with said inlet opening and said outlet opening, respectively, with tunnel having an upper wall, a lower wall and two side walls, means for circulating treatment air in said plant by a pressure increase tending to produce an air flow in one direction in at least one of said inlet tunnel and said outlet tunnel, nozzles arranged in said upper wall of said at least one tunnel and directed substantially opposite said one direction of said air flow, an air fan means for producing air jets emanating from said nozzles, means for evacuating the excess air in the tunnel produced by said air jets comprising openings formed in said lower wall.

8. The air treatment plant of claim 7, wherein the air fan means generating the air jets comprises means for generating a pressure outside the tunnel which is substantially higher than a maximum pressure in the tunnel.

9. The air treatment plant of claim 7, wherein, in each section of the tunnel length, the area of the openings is dimensioned in such a manner that said openings let through the excess air in that tunnel section length.

10. The air treatment plant of claim 9, wherein the area of the openings increase in said one direction.

11. The air treatment plant of claim 7, wherein said upper wall is made of a plurality of metal sheets overlapping in a longitudinal direction of the tunnel and having intermediate spaces for forming nozzles distributed across the entire width and entire length of the upper wall.

* * * * *

UNITED STATES PATENT AND TRADEMARK OFFICE
CERTIFICATE OF CORRECTION

PATENT NO.  :   5,247,801
DATED       :   September 28, 1993
INVENTOR(S) :   JAXMAR et al It is certified that error appears in the above-indentified patent and that said Letters Patent is hereby corrected as shown below:

On the title page:   between [21] and [30], delete the line starting with [22] and insert therefor the following:

-- [22]  PCT Filed:          Nov. 28, 1990

[86]  PCT No.:           PCT/SE90/00781
      §371 Date:         Jun. 9, 1992
      §102(e) Date:      Jun. 9, 1992

[87]  PCT Pub. No.:      WO91/08430
      PCT Pub. Date:     Jun. 13, 1991 --

Signed and Sealed this

Fourteenth Day of February, 1995

Attest:

BRUCE LEHMAN

Attesting Officer        Commissioner of Patents and Trademarks